United States Patent
Beyer et al.

(10) Patent No.: US 10,627,804 B2
(45) Date of Patent: Apr. 21, 2020

(54) PRINTING OF UTILITY FLOWPATHS USING FLOWPATH MODEL

(71) Applicant: Microsoft Technology Licensing, LLC, Redmond, WA (US)

(72) Inventors: Glen Robert Beyer, Sammamish, WA (US); Michael Phillip Czamara, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/981,743

(22) Filed: May 16, 2018

(65) Prior Publication Data

US 2019/0354082 A1 Nov. 21, 2019

(51) Int. Cl.

| G05B 19/4099 | (2006.01) |
|---|---|
| B33Y 10/00 | (2015.01) |
| B33Y 50/02 | (2015.01) |
| B33Y 30/00 | (2015.01) |
| B29C 64/393 | (2017.01) |
| B22F 3/00 | (2006.01) |
| G06F 17/50 | (2006.01) |

(52) U.S. Cl.
CPC .......... *G05B 19/4099* (2013.01); *B22F 3/008* (2013.01); *B29C 64/393* (2017.08); *B33Y 30/00* (2014.12); *B33Y 50/02* (2014.12); *B33Y 10/00* (2014.12); *G05B 2219/35134* (2013.01); *G05B 2219/49007* (2013.01)

(58) Field of Classification Search
CPC ............ G05B 17/5009; G05B 17/5004; G05B 17/50; G05B 2219/49023; G05B 19/4099
USPC .......................................................... 700/98
See application file for complete search history.

(56) References Cited

U.S. PATENT DOCUMENTS

| 2007/0229508 | A1* | 10/2007 | Connor ................... G06F 17/50 345/442 |
| 2011/0087350 | A1* | 4/2011 | Fogel ...................... G06F 17/50 700/98 |

* cited by examiner

*Primary Examiner* — Michael J Brown
(74) *Attorney, Agent, or Firm* — Workman Nydegger

(57) ABSTRACT

The formulation of multiple physical flowpaths that fit within a physical space. The formation of physical flowpaths is done by a 3-D printer using a representation of that flowpath that is within a utility flowpath model. The flowpaths are represented in the utility flowpath model so that there is high certainty that the respective physical flowpaths will actual fit into a physical space even if space is limited. Furthermore, the 3-D printing of those physical flowpaths ensures high precision in formulating the physical flowpaths to match the utility flowpath representation.

18 Claims, 4 Drawing Sheets

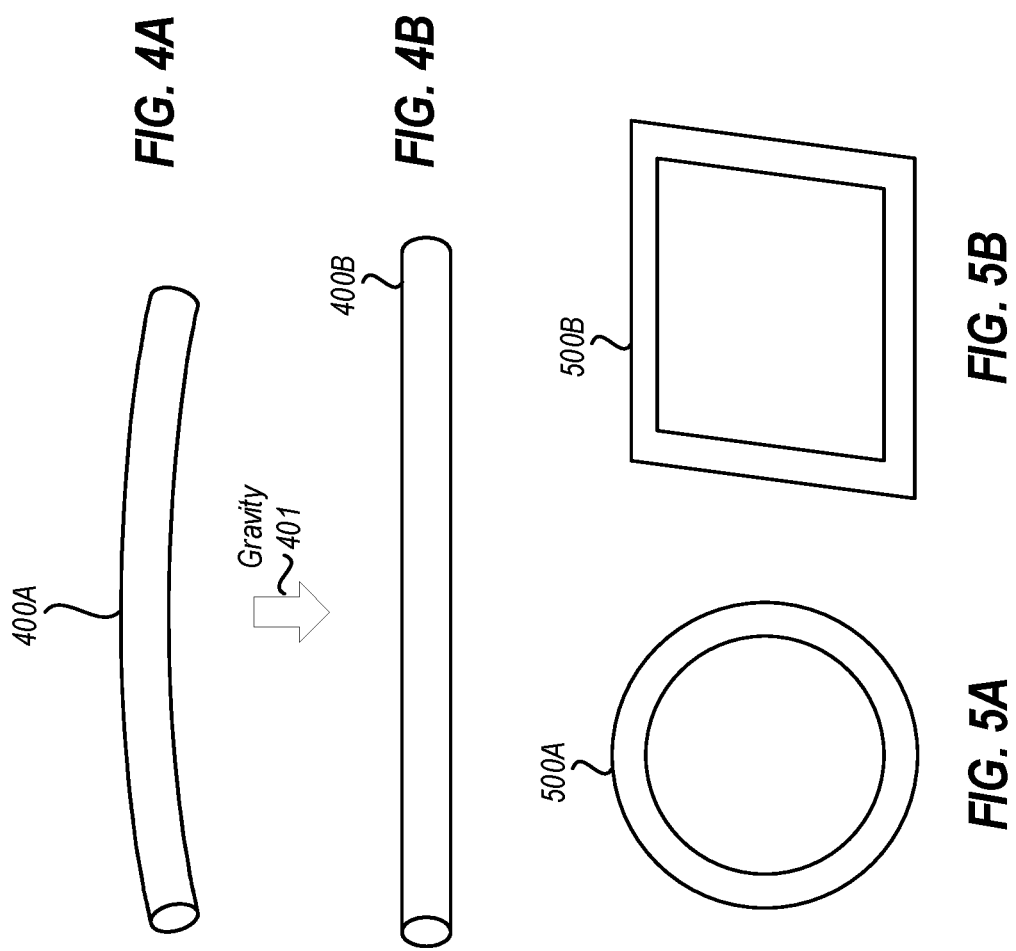

PRINTING OF UTILITY FLOWPATHS USING FLOWPATH MODEL

BACKGROUND

In order to support the functionality of a physical space, utilities are often provided to that physical space. Examples of utilities include electricity, natural gas, water, telephone, data connections, and the like. In order to properly flow these utilities, a flowpath is required. Such utilities may be supplied by public utility services, or they may be provided by other private sources that are outside of, or even within, the physical space. Air may also be considered a utility as it, like all other utilities, requires a flowpath.

For electricity, there may be insulated electrical conductors (e.g., wires or cables). Depending on the circumstances and code, a conduit may encase those insulated electrical conductors. Natural gas may be flowed within a tube. Water may be supplied through a pipe. Telephone and data connections may be supplied through communication cables or wires.

A typical space often has a wide variety of utility flowpaths. The density of the flowpaths can be quite high when the available area for utilities is limited and/or where the functionality of the working space depends upon coordinated occupancy of significant amounts or variety of utilities. For instance, semiconductor fabrication plants, manufacturing or assembly plants, and datacenters may require complex networks of utility flowpaths delivered to diverse types of workspaces. Yet, space for delivery of utilities has its limits.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the formulation of multiple physical flowpaths that fit within a physical space. The formation of physical flowpaths is done by a 3-D printer using a representation of that flowpath that is within a utility flowpath model. The flowpaths are represented in the utility flowpath model so that there is high certainty that the respective physical flowpaths will actually fit into a physical space even if space is limited. Furthermore, the 3-D printing of those physical flowpaths ensures high precision in formulating the physical flowpaths to match the utility flowpath representation. Thus, flowpaths can be inserted even within dense spaces while providing the designed flow in the designed places.

Conventionally, utility flowpaths are at least partially formed or assembled by human beings. The possibility for human error means that there may be less precision in the shape of the flowpath. For instance, when forming an electrical power conduit, a skilled worker may be tasked with the job of formulating an appropriate bend. But there will typically be some error in the positioning of that bend. While that positioning error may be quite minor when considering that single flowpath in isolation, when one considers the large quantities of additional flowpaths is that environment, the errors can add up to cause some spacing between flowpaths to be less than ideal.

For instance, arcing of electrical power might occur, or data signals may be corrupted by electromagnetic radiation caused by power lines that are too proximate. Flowpaths may perhaps become in contact allowing surrounding vibration to slowly wear the flowpaths, leading to premature flowpath failure. Contacting flowpaths may also cause undesired acoustic noise. Thus, more precise shaping and positioning of flowpaths provides more safety and functionality of the physical space that relies on utilities delivered through those flowpaths.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates a printed flowpath member that is deformed so that when external forces are applied, the flowpath member assumes an undeformed state;

FIG. 4B illustrates the printed flowpath member once assembled and subject to gravity;

FIG. 5A illustrates a first example cross-section of a printed flowpath member in which the flowpath is a circular conduit;

FIG. 5B illustrates a second example cross-section of a printed flowpath member in which the flowpath is a parallelepiped conduit;

FIG. 5C illustrates a third example cross-section of a printed flowpath member in which the flowpath includes multiple constituent guidepaths.

DETAILED DESCRIPTION

At least some embodiments described herein relate to the formulation of multiple physical flowpaths that fit within a physical space. The formation of physical flowpaths is done by a 3-D printer using a representation of that flowpath that is within a utility flowpath model. The flowpaths are represented in the utility flowpath model so that there is high certainty that the respective physical flowpaths will actual fit into a physical space even if space is limited. Furthermore, the 3-D printing of those physical flowpaths ensures high precision in formulating the physical flowpaths to match the utility flowpath representation. Thus, flowpaths can be inserted even within dense spaces while providing the designed flow in the designed places.

Conventionally, utility flowpaths are at least partially formed or assembled by human beings. The possibility for human error means that there may be less precision in the shape of the flowpath. For instance, when forming an electrical power conduit, a skilled worker may be tasked with the job of formulating an appropriate bend. But there will typically be some error in the positioning of that bend. While that positioning error may be quite minor when considering that single flowpath in isolation, when one considers the large quantities of additional flowpaths is that environment, the errors can add up to cause some spacing between flowpaths to be less than ideal.

For instance, arching of electrical power might occur, or data signals may be corrupted by electromagnetic radiation caused by power lines that are too proximate. Flowpaths may perhaps become in contact allowing surrounding vibration to slowly wear the flowpaths, leading to premature flowpath failure. Contacting flowpaths may also cause undesired acoustic noise. Thus, more precise shaping and positioning of flowpaths provides more safety and functionality of the physical space that relies on utilities delivered through those flowpaths.

Figure 1:
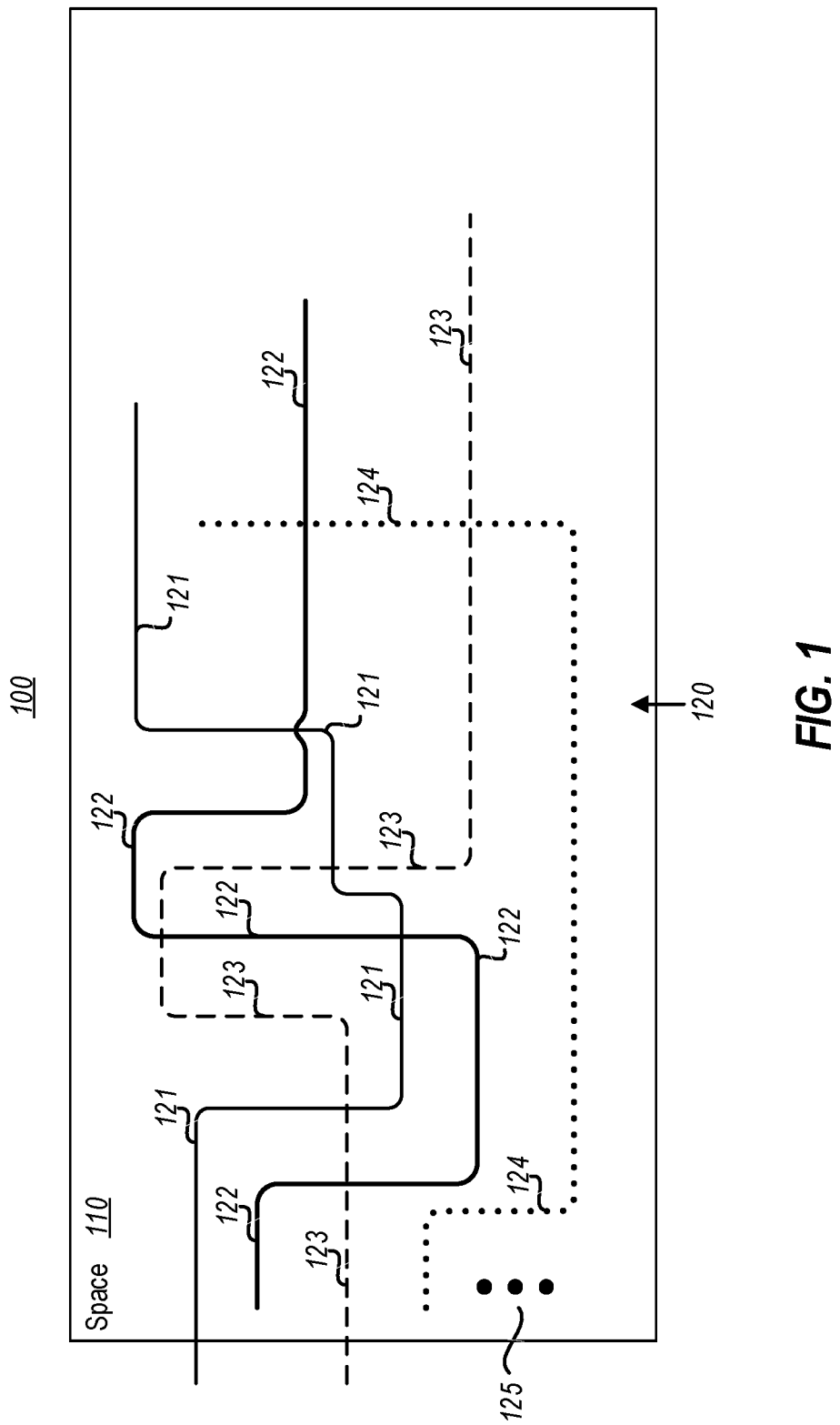
FIG. 1 illustrates an environment that includes a physical space that includes multiple utility flowpaths.

FIG. 1 illustrates an environment 100 that includes a physical space 110 that includes multiple utility flowpaths 121 through 125 (collectively referred to as "flowpaths 120"). The principles described herein are not limited to the specific type of physical space 110. The space 110 may be an indoor space, an outdoor space, or a combination of indoor and outdoor spaces. Examples of an indoor space might be a building or cluster of buildings. For instance, the indoor space might be a factory, a manufacturing plant, a semiconductor chip fabrication plant, a laboratory, a particle accelerator, a corporate headquarters, an apartment building, a high-rise skyscraper, an airplane, a subway system, a mine, a cruise ship or any other space. The physical space 110 is symbolically represented in FIG. 1.

The utility flowpaths provide any utility that is useful within the physical space 110. Some types of utilities, such as electrical power and airflow (HVAC), are useful for almost any types of space. Other common types of utilities include natural gas, water, drainage, communication (e.g., Ethernet or fiber optics), or the like. Some utilities may be more specific and specialized, such as chemical supply, vacuum, or the like.

The physical space 110 is illustrated as symbolically including four flowpaths 121 through 124. The ellipses 125 represents that the principles described herein are not limited to the utility types of these flowpaths, nor to the number of flowpaths. The flowpaths 121 and 122 are represented with a solid line to represent that they could flow one type of utility. The flowpath 123 is dashed-lined to represent that this could be a second type of utility. The flowpath 124 is represented with a dotted line to represent that this could be a third type of utility. The ellipsis 125 again represents that the principles described herein are not limited to physical spaces that have flowpaths for any particular number of utility types, nor to there being any particular number of flowpaths per utility type.

Two of the flowpaths 121 and 123 are shown as originating outside of the physical space 110. On the other hand, two of the flowpaths 122 and 124 are shown as being completely contained within the physical space 110. This is done to represent that the principles described herein may apply regardless of whether the flowpaths are completely contained within the physical space 110, or are supplied from outside of the physical space. Examples of utilities supplied from outside of the physical space could be public utilities such as water provided by a water company, or electricity provided by a power grid. Examples of utilities supplied from inside of the physical space could be electricity supplied by fuel cells within the physical space, vacuum provided by a motor assembly located within the physical space, chemicals provided by a chemical box located within the physical space, and so forth. In the case of a cruise ship or space lab, the flowpaths may be entirely internal.

The flowpaths 120 are shown as intertwined to represent that there is a limited amount of area dedicated for utility flowpaths, and the length of each flowpath will meander amongst other flowpaths as its length is traversed. Furthermore, though the illustration is of course, two dimensional, the physical flowpaths may extend in reality in three dimensions, including vertically, as well as horizontally.

Figure 2:
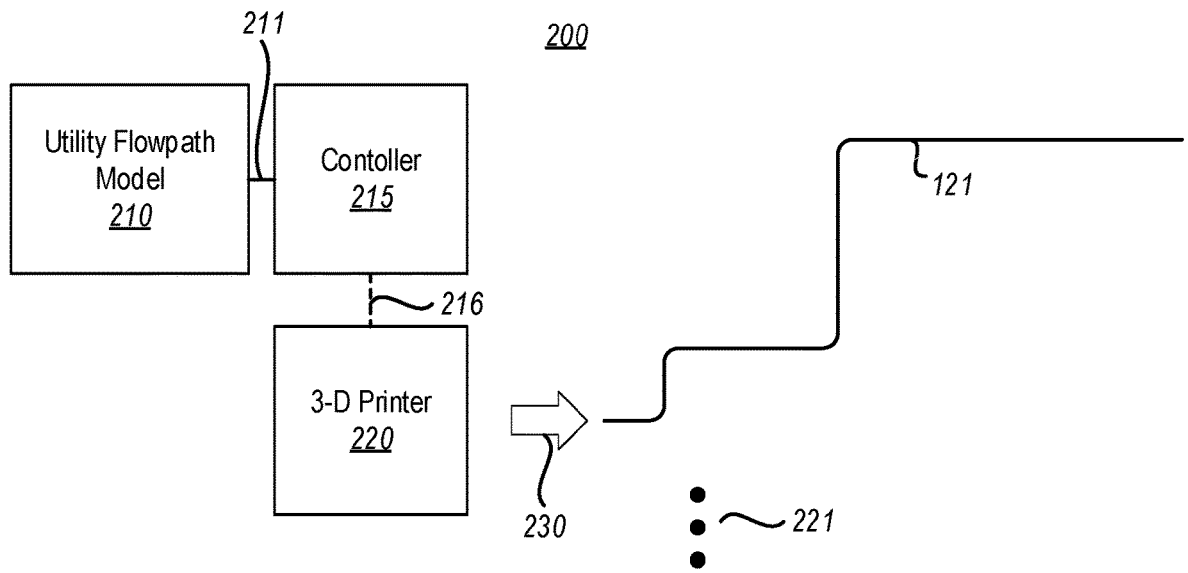
FIG. 2 illustrates a system in which flowpaths may be constructed using a 3-D printer and a utility flowpath model, and thereafter assembled into the physical space of FIG. 1.

FIG. 2 illustrates a system 200 in which flowpaths may be constructed and assembled into a space. For instance, the system 200 of FIG. 2 may be used to create and assemble flowpaths 120 into the physical space 110 of FIG. 1. Here, there is a utility flowpath model 210 that defines the multiple flowpaths that are to be placed within the physical space. The model 210 may be a three-dimensional model that represents a three dimensional placement of the assembled flowpaths 120 within the physical space 210. The three-dimensional model may be represented on a computing system, such as the computing system 600 described below with respect to FIG. 6.

The system 200 also includes a 3-D printer 220 that is capable of printing out physical flowpaths as directed by a controller 215. The controller 215 may be a component that operates on a computing system, such as the computing system 600 described below with respect to FIG. 6. The controller 215 may, for instance, be a driver for the 3-D printer 220. The controller 215 operates to cause the 3-D printer to print flowpaths that are represented in the utility flowpath model 210. Accordingly, as represented by line 211, the controller 215 is shown as being in communication with the utility flowpath model 210 to received direction on what to print. As represented by line 216, the controller 215 communicates with the 3-D printer 220 to cause the actual physical printing to occur.

The 3-D printer 220 may, for instance, be a digital 3-D printer. The process of printing out a flowpath is represented by arrow 230 in FIG. 2. In this particular case, the printer 220 has printed part of a flowpath 121 of FIG. 1. In this case, as illustrated in FIG. 2, the rightmost portion of the flowpath 121 has been printed, but the 3-D printer 220 continues to print the remaining portion of the flowpath 121. The ellipses 221 represents that the printer 220 may be used to print all or any subset of the flowpaths 120 of FIG. 1. The principles described herein are not limited to the type of material that the utility flowpath is made of. For instance, the flowpath may be made of any type of metal or any type of plastic, or any other material that can be printed by a 3-D printer.

Figure 3:
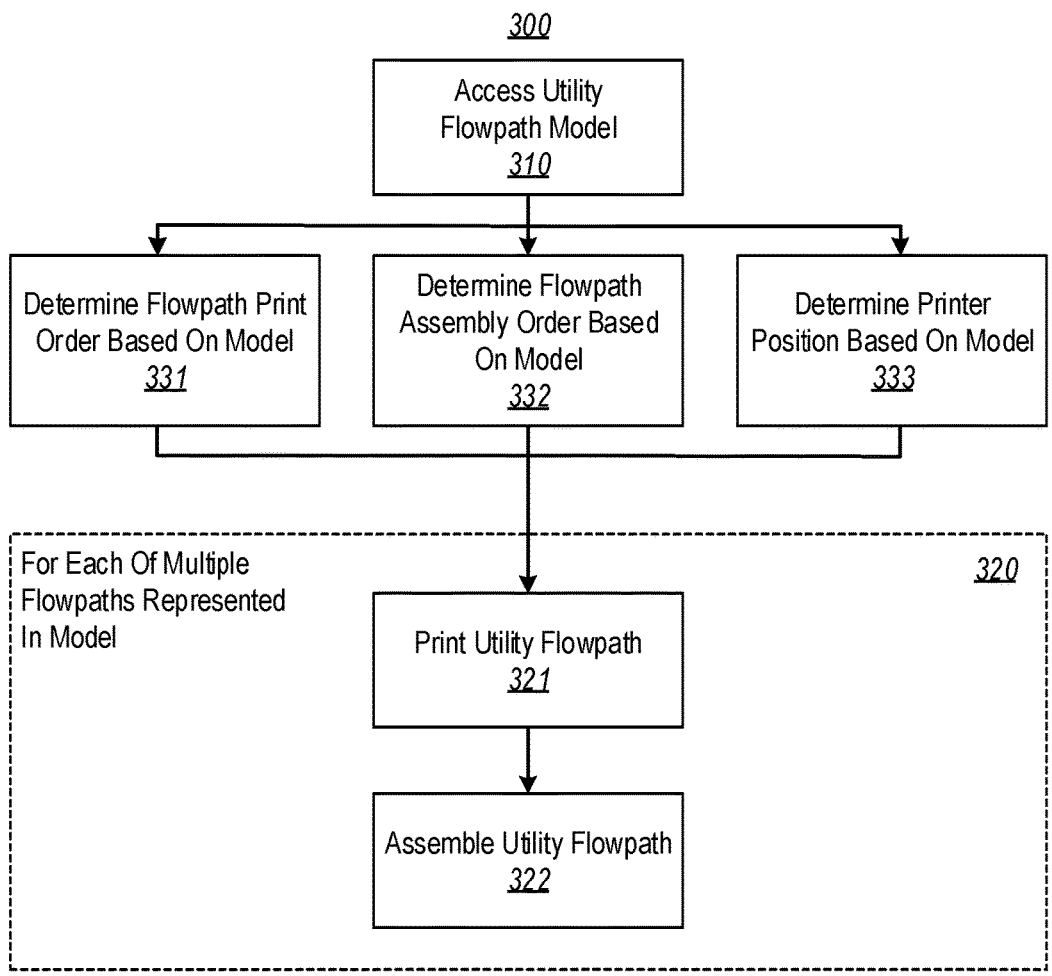
FIG. 3 illustrates a flowchart of a method for formulating a plurality of physical flowpaths that fit within a physical space in accordance with the principles described herein.

FIG. 3 illustrates a flowchart of a method 300 for formulating a plurality of physical flowpaths that fit within a physical space. The method 300 of FIG. 3 may be performed by the system 200 of FIG. 2 in order to formulate physical flowpaths 120 with the physical space 100 of FIG. 1. Accordingly, the method 300 of FIG. 3 will be described with frequent reference to FIGS. 1 and 2.

The method 300 includes accessing (act 310) a utility flowpath model that defines multiple utility flowpaths. For instance, in FIG. 2, the controller 215 may access the flowpath model 210 along the communication channel 211.

Then, for each of at least some of the utility flowpaths represented within the flowpath model, the context of box 320 may be performed. Specifically, a utility flowpath defined in the utility flowpath model is printed using the 3-D printer (act 321). For instance, in FIG. 2, the 3-D printer 220 is used to print the corresponding utility flowpath. In the example of FIG. 2, the controller 215 directs (along communication channel 216) the printer 220 to print each utility flowpath based on the representation of that flowpath within the utility flowpath model 210. In the illustrated example, the flowpath 121 is illustrated as being printed out.

Also, for each of at least some of the printed utility flowpaths, that flowpath is then assembled in position within the physical space (act 322). For instance, in FIG. 1, the utility flowpath 121 may be assembled in the physical space 110. The content of box 320 may be repeated until each of the utility flowpaths are printed and assembled into position within the physical space, as represented by FIG. 1. Because the flowpaths are printed, there is no need to cut the flowpath prior to assembly. Such cuts can often result in sharp edges, which can do damage to surrounding flowpaths or equipment over time (e.g., due to vibration causing a sawing behavior).

In one embodiment, the utility flowpath model is also used to determine (act 331) a print order of the printed utility flowpaths. Such might be beneficial to, for instance, print out the utility flowpaths in a manner that most efficiently utilizes the 3-D printer, most efficiently uses transportation for moving the printed flowpaths into position, most productively uses storage space until the physical utility flowpaths can be properly assembled, and so forth.

Alternatively or in addition, the utility flowpath model may also be used to determine (act 332) an assembly order of the printed utility flowpaths. Such may be helpful if, for instance, it is impossible to assemble one utility flowpath if another utility flowpath has been previously assembled, or if assembly in some order makes more sense. As an example, deeper layers of utility flowpaths may be first assembled prior to utility flowpaths that cover those deeper utility flowpaths. This is helpful due to the potential that the utility flowpaths may meander and entangle with each other along their lengths. The determined assembly order may also have influence on the determined print order. For instance, the printing of the later flowpaths to be assembled may be deferred until after the printing of the earlier flowpaths to be assembled, so that there is not an excessive amount or volume of printed flowpaths awaiting assembly.

While the 3-D printer may print the utility flowpaths off-site for later transportation into the physical space for assembly, the 3-D printer may also be positioned within the physical space such that when the 3-D printer has finished printing, the printed utility flowpath is in its appropriate position for assembly already. Accordingly, the utility flowpath model may be used to determine (act 333) how to place the 3-D printer within the physical space such that after the 3-D printer completes printing of the printed flowpath, the printed flowpath is approximately in position within the physical space. The printer may be moved into that position as part of printing the utility flowpath (act 321) so as to make assemble of that flowpath into position (act 322) easier or more efficient.

The acts 331, 332 and 333 are shown in parallel simply to emphasize that there is no required temporal ordering in how these determinations may be made. In fact, the acts are optional and thus might not be performed at all, consistent with the principles described herein.

The controller 215, the 3-D printer 220, and even the utility flowpath model 210 may have a mechanism to compensate for environmental forces that occur in physical space when determining how the flowpath model should be shaped. For instance, due to gravity, a long stretch of length may typically be caused to bend downward at the center. That length may be printed so that, in the absence of gravity, the center would be bent upwards, so that in the presence of gravity, the length assumes a straight shape. Similar compensations may be made for other environmental forces such as anticipated heating or cooling, possible vibration or seismic movement, centripetal forces, and so forth. For instance, FIG. 4A represents a printed length of a flowpath 400A which is slightly curved. FIG. 4B represents an assembled length of that same flowpath 400B, which is now straight due to the application (as represented by arrow 401) of gravity.

Artificial intelligence may be applied to predict the types of environmental forces that could be experienced after assembly, and make an appropriate decision regarding shaping of the utility flowpath given sensitivities to these environmental forces. As an example, if the utilities were to be included within a stadium, the artificial intelligence may account for stadium noise and vibrations caused by wind, earthquakes, and fan behavior (e.g., noise, cheering, stomping, entering and exiting).

Although not required, the 3-D printer may be a digital printer that takes digital representations of the utility flowpath. For instance, the digital representations may cause a cross-section of the utility flowpath to be printed at the thickness of the resolution of the printer. The cross-section may be uniform across the entire length of the utility flowpath. In that case, the representation may be very compactly represented as a cross-section, along with a representation of a centerline of the flowpath. Of course, that centerline may bend to represent bending of the utility flowpath. Alternatively, even the cross-section of the utility flowpath may change over the length of the utility flowpath.

In one embodiment, the utility flowpath is printed as a conduit. Such a conduit might have a relatively constant thickness in wall and might have a circular cross section (as might be the case for a cylindrical conduit). An example cross-section of a cylindrical utility flowpath is represented by the cross section 500A of FIG. 5A. Alternatively, the conduit might have other shapes such as a parallelepiped. An example cross-section of a parallelepiped utility flowpath is represented by the cross section 500B of FIG. 5B.

The utility flowpath may also have a more complex cross section that might include some smaller constituent flowpaths for guiding of utility conductors within the larger flowpath. FIG. 5C illustrates an example cross-section 500C of such a utility flowpath. Here, the cross-section includes an outer surface 510, but also includes multiple inner guidepaths 511A, 511B, 511C, 512A, 512B, and 513 that may each be used as a flowpath. These internal flowpaths may be used for the same type of utility of even for different utilities. For instance, guidepaths 511A, 511B and 511C may be used to flow utilities of a first type; guidepaths 512A and 512B may be used to flow utilities of a second type; and guidepaths 513 may be used to flow utilities of a third type.

Thus, the principles described herein may be used to print a flowpath that is able to flow multiple different types of utilities, such as electricity, signal, water, and the like, while maintaining appropriate separation between the flows. As an example, the guidepaths 511A, 511B and 513 may each be for guiding a different power cable. Guidepath 513 might be for flowing water. Guidepaths 512A and 512B might be for flowing signal.

Accordingly, the principles described herein provide for an advanced mechanism for 3-D printing physical flowpaths to ensure high precision in formulating the physical flowpaths to match the utility flowpath representation. Thus, flowpaths can be inserted even within dense spaces while providing the designed flow in the designed places, and with appropriate spacing between flowpaths.

The utility flowpath model 210 may be represented within a computing system, furthermore, the controller 215 may be a component of a computing system. Accordingly, a computing system will now be described suitable for operating the controller 215 and maintaining the utility flowpath model 210.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
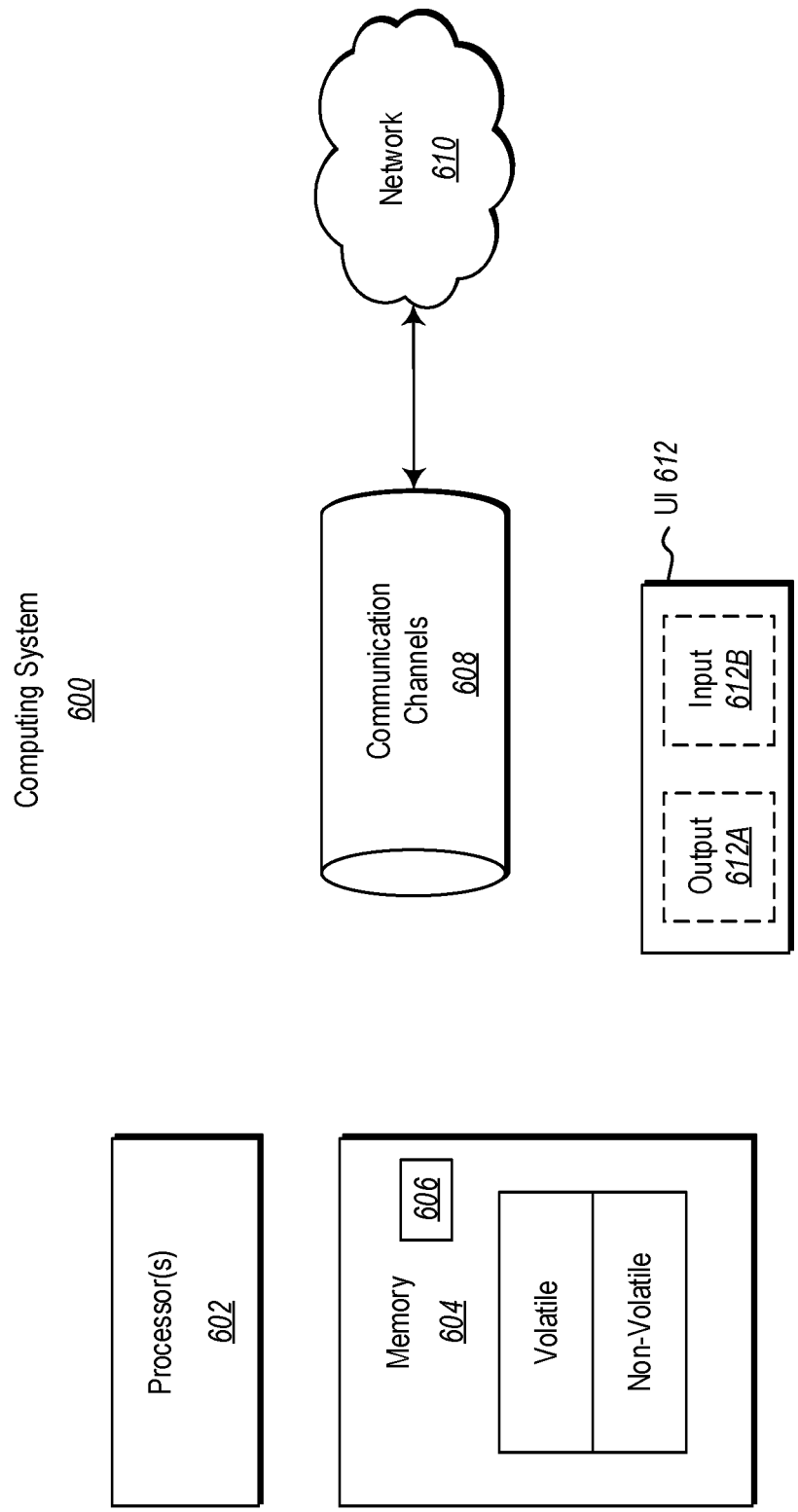
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, and/or methods that may be executed on the computing system, whether such an executable component exists in the heap of a computing system, or whether the executable component exists on computer-readable storage media. The controller 215 is an example of such an executable component.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610. As an example, the memory 604 may contain the utility flowpath model 210 of FIG. 2.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some transaction (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for formulating a plurality of physical flowpaths that fit within a physical space, the method comprising:
   access a utility flowpath model that defines a plurality of utility flowpaths in a space;
   use the utility flowpath model to determine a printing order or an order of assembly for the utility flowpaths of the plurality of utility flowpaths within the space; and
   for at least some of the plurality of utility flowpaths defined in the utility flowpath model, use a 3-D printer to print at least a portion of each corresponding utility flowpath.

2. The method in accordance with claim 1, further comprising:
   assembling at least one of the printed utility flowpaths in the physical space.

3. The method in accordance with claim 2, wherein the printed flowpaths are not cut prior to assembling the printed flowpaths into the physical space.

4. The method in accordance with claim 1, wherein at least one of the printed utility flowpaths comprises an electrical power utility flowpath.

5. The method in accordance with claim 1, wherein at least one of the printed utility flowpaths comprises a signal utility flowpath.

6. The method in accordance with claim 1, wherein at least one of the printed utility flowpaths comprises a liquid utility flowpath.

7. The method in accordance with claim 1, wherein at least one of the printed utility flowpaths comprises a plurality of internal guidepaths within the printed utility flowpath.

8. The method in accordance with claim 7, wherein at least one of the plurality of internal guidepaths is for guiding a first utility type, and at least one other of the plurality of internal guidepaths is for guiding a second utility type.

9. The method in accordance with claim 7, wherein at least some of the plurality of internal guidepaths are for guiding different power cables.

10. The method in accordance with claim 1, wherein at least one of the printed utility flowpaths is composed of metal.

11. The method in accordance with claim 1, wherein at least one of the printed utility flowpaths is composed of plastic.

12. The method in accordance with claim 1, wherein at least one of the printed utility flowpaths is printed to compensate for environmental forces that occur in the physical space.

13. The method in accordance with claim 1, at least one of the printed utility flowpaths having a varying cross-section.

14. The method in accordance with claim 1, the 3-D printer comprising a digital printer.

15. The method in accordance with claim 1, the physical space comprising a datacenter.

16. A system for formulating a plurality of physical flowpaths that fit within a physical space, the system comprising:
   a computing system that has a representation of a utility flowpath model that defines a plurality of utility flowpaths in a space;
   a 3-D printer; and
   a controller that is configured to, for at least some of a plurality of utility flowpaths defined in the utility flowpath model, direct the 3-D printer to print at least a portion of the corresponding utility flowpath, the corresponding utility flowpath comprising a plurality of internal guidepaths within an outer surface of the corresponding utility flowpath.

17. A method for formulating a plurality of physical flowpaths that fit within a physical space, the method comprising:
   access a utility flowpath model that defines a plurality of utility flowpaths in the physical space;
   for at some of the plurality of utility flowpaths defined in the utility flowpath model, use a 3-D printer to print at least a portion of each corresponding utility flowpath; and
   assembling at least one of the printed utility flowpaths in the physical space, wherein the printed flowpaths are not cut prior to assembling the printed flowpaths into the physical space.

18. A method for formulating a plurality of physical flowpaths that fit within a physical space, the method comprising:
   access a utility flowpath model that defines a plurality of utility flowpaths in a space;
   for at least some of the plurality of utility flowpaths defined in the utility flowpath model, use a 3-D printer to print at least a portion of each corresponding utility flowpath; and
   for at least one of the printed flowpaths, use the utility flowpath model to determine how to place the 3-D printer within the physical space such that after the 3-D printer completes printing of the printed flowpath, the printed flowpath is in an approximate position for assembly within the physical space.

* * * * *